US007637250B2

United States Patent
Bromberg et al.

(10) Patent No.: US 7,637,250 B2
(45) Date of Patent: Dec. 29, 2009

(54) GASOLINE ENGINE SYSTEM USING VARIABLE DIRECT ETHANOL INJECTION AND ENGINE SHUTDOWN

(75) Inventors: Leslie Bromberg, Sharon, MA (US); Paul Blumberg, Southfield, MI (US); Daniel R. Cohn, Cambridge, MA (US); John Heywood, Newton, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 170 days.

(21) Appl. No.: 11/683,564

(22) Filed: Mar. 8, 2007

(65) Prior Publication Data

US 2008/0173278 A1 Jul. 24, 2008

Related U.S. Application Data

(60) Provisional application No. 60/781,598, filed on Mar. 10, 2006.

(51) Int. Cl.
*F02D 41/12* (2006.01)
(52) U.S. Cl. ............. 123/431; 123/179.4; 123/198 DB; 123/406.31; 123/406.32
(58) Field of Classification Search ................. 123/431, 123/406.3, 406.31, 406.32, 179.4, 198 DB
See application file for complete search history.

(56) References Cited

U.S. PATENT DOCUMENTS

| 4,541,383 A | * | 9/1985 | Jessel | 123/435 |
|---|---|---|---|---|
| 6,032,632 A | * | 3/2000 | Bolenz et al. | 123/179.3 |
| 6,098,584 A | * | 8/2000 | Ahner et al. | 123/179.3 |
| 6,951,202 B2 | * | 10/2005 | Oda | 123/406.29 |
| 7,077,105 B2 | * | 7/2006 | Oda et al. | 123/406.3 |
| 7,212,910 B2 | * | 5/2007 | Akasaka | 701/112 |
| 2004/0159297 A1 | * | 8/2004 | Kataoka et al. | 123/179.4 |
| 2005/0188939 A1 | * | 9/2005 | Iwatsuki et al. | 123/179.4 |
| 2006/0048734 A1 | * | 3/2006 | Kataoka et al. | 123/179.4 |
| 2006/0157014 A1 | * | 7/2006 | Kondo | 123/179.4 |
| 2007/0119414 A1 | * | 5/2007 | Leone et al. | 123/295 |

OTHER PUBLICATIONS

Bromberg et al, Calculations of Knock Suppression In Highly Turbocharged Gasoline/Ethanol Engines Using Direct Ethanol Injection, Jul. 7, 2005, MIT Paper.*

* cited by examiner

*Primary Examiner*—Erick Solis
(74) *Attorney, Agent, or Firm*—Nields, Lemack & Frame, LLC

(57) ABSTRACT

Fuel management system for operation of a spark ignition gasoline engine. The system includes a gasoline engine powering the vehicle and a source of gasoline for introduction into the engine. A source of an anti-knock fuel such as ethanol is provided. An injector directly injects the anti-knock fuel into a cylinder of the engine and the control system shuts down the engine by stopping gasoline and anti-knock agent flow into the engine during vehicle deceleration and idling and restarts the engine upon driver demand. Direct ethanol injection and engine shutdown results in efficiencies similar to those of full hybrid vehicles.

18 Claims, 1 Drawing Sheet

GASOLINE ENGINE SYSTEM USING VARIABLE DIRECT ETHANOL INJECTION AND ENGINE SHUTDOWN

This application claims priority to Provisional Application Ser. No. 60/781,598 filed Mar. 10, 2006, the contents of which are incorporated herein by reference.

BACKGROUND OF THE INVENTION

This invention relates to spark ignition engines and more particularly to a gasoline engine system using variable direct ethanol injection and engine shutdown for increased vehicle efficiency.

Hybrid automobiles are becoming increasingly popular because of their demonstrated fuel economy benefits. Hybrids usually combine a gasoline engine with an electric motor along with sophisticated controls to establish operating modes. Those who have analyzed electric hybrid vehicle operation have concluded that the fuel economy benefits come from three primary sources (excluding unusual aerodynamically shaped vehicles that are not fully functional). A first source of fuel economy benefit is the regenerative capture of energy derived from the vehicle's kinetic energy during vehicle braking. Regenerative systems usually include electric generators/motors, a high voltage battery and power electronic components. Thus, a portion of the vehicle's kinetic energy that would otherwise be lost to heat during braking is stored as electrical energy in the vehicle's battery.

Another source of hybrid vehicle fuel economy results from optimization of the traditional internal combustion spark-ignited engine to produce better specific fuel consumption numbers over its operating range. Typically, the optimization includes engine downsizing and the use of a modified engine cycle (such as the Atkinson cycle) that further lowers effective engine displacement, but improves thermal efficiency. An example of this approach is the Toyota Prius. More recent variants have employed larger engines (Honda Accord, V-6 hybrid) with cylinder disabling.

A third source of fuel economy benefits comes from the shutdown of the engine during deceleration and idle. During periods of engine shutdown, onboard electric power is used to keep critical auxiliary components in operation. Critical auxiliary components include power steering, power brakes and lights. A non-critical, though highly desirable, auxiliary is air conditioning. For extended periods of air-conditioner operation in hot climates, the engine must be restarted during idle periods when the vehicle is not moving to prevent excessive battery drawdown.

The breakdown of fuel savings from these three sources depends very much on driving cycle and environmental conditions (hot or cold), but for typical ambient temperatures and moderate cycles (modest acceleration and braking rates of 3 to 4 mph/sec), well over 75% of the fuel economy improvement comes from the optimization of the traditional internal combustion engine and shutdown of the engine during deceleration and idle. Regeneration, even under modest circumstances, is a relatively small contributor. This relatively smaller contribution results from the fact that, in general, only one axle is connected to the electric power train (and therefore available for braking energy recovery) and the braking energy of the other axle is therefore not even available for recovery. In such a configuration, front wheel drive is preferred since most braking is accomplished with the front brakes due to weight distribution and weight shift on deceleration. Further, because electric generators have to be controlled to avoid jerkiness in a regenerative system when the brakes are applied, a "feathering-in" strategy is used that wastes some of the kinetic energy associated with higher vehicle speeds. Also, the "round trip" efficiency of stored electrical energy is no more than approximately 60%.

U.S. patent application Ser. No. 10/991,774 filed Nov. 18, 2004 deals with optimization of the traditional spark-ignited gasoline engine to produce higher fuel efficiency by utilizing the separately controlled direct injection of ethanol to permit higher boost pressures without detrimental knock. Such a variable direct-ethanol injection gasoline engine can achieve improvements, close to those achieved in current versions of hybrids.

An object of the present invention is to further improve the efficiency and to get substantially the same or perhaps even better fuel economy benefits as a full hybrid in a direct ethanol injection engine.

SUMMARY OF THE INVENTION

In one aspect, the invention is a fuel management system for operation of a spark ignition gasoline engine in a vehicle. The system includes a gasoline engine powering the vehicle and a source of gasoline for introduction into the engine. A source of an antiknock fuel, such as ethanol or ethanol blends is provided along with an injector for direct injection of the ethanol into a cylinder of the engine when the ethanol is needed to prevent knock. A control system is provided for shutting down the engine by stopping gasoline and ethanol flow into the engine during vehicle deceleration and idling and restarting the engine upon driver demand. In a preferred embodiment, the control system disables the shutting down of the engine during deceleration and idling when an auxiliary power or energy requirement exceeds a selected level. It is preferred to use direct injection during engine restart to supplement port fuel injection of gasoline while a fuel film that feeds the engine is reestablished so as to minimize energy, emissions and time required for engine restart.

A preferred embodiment also includes a valve disabler for all engine valves. It is also preferred that the engine be turbocharged or supercharged with manifold pressure increased by at least a factor of two over a non-pressure-boosted engine. This embodiment may also include a low voltage motor to restart the engine after shutdown during idle. A low voltage (such as conventional or near conventional 12-Volt) motor is appropriate.

DESCRIPTION OF THE PREFERRED EMBODIMENTS

Figure 1:
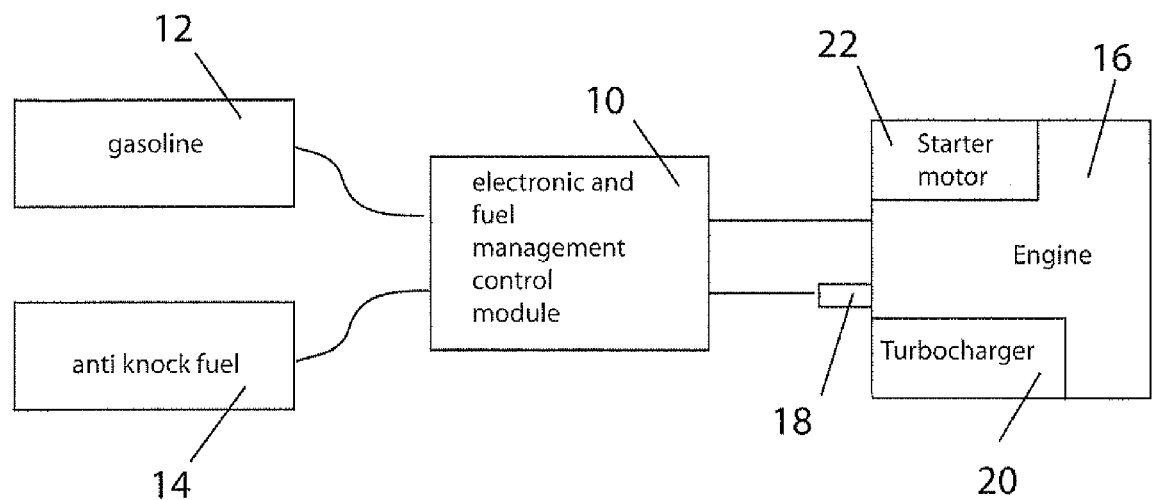
FIG. 1 is a block diagram illustrating the fuel management system according to an embodiment of the invention.

The inventors herein recognized that in order to get substantially the same fuel economy benefits in a variable direct ethanol injection gasoline engine as achieved by a full hybrid, a mechanism for engine shutdown and restart is desirable. There are two approaches to an engine shutdown and restart mode of operation. One approach is to use an integrated starter generator (ISG) that is usually placed between the engine and transmission in a high voltage (such as 42-Volt) electrical system vehicle. The ISG has a very minor regenerative capability but, more importantly, the vehicle can be launched on the electric motor in the ISG, which also functions as a starter for the internal combustion engine when the vehicle reaches a predetermined speed. Many prototypes of ISG systems have been built and demonstrated. The 42-volt ISG is not, however, without a significant cost increment and it is typically not used alone because the fuel economy benefits of combining it with a standard engine are not substantial. Such a system also lacks sufficient power to add significantly to vehicle acceleration from rest, as in a full hybrid, and therefore does not allow for substantial engine downsizing.

One of the distinct advantages of the variable direct ethanol injection approach disclosed herein and in pending application Ser. No. 10/991,774 is that the pressure boost ratio (that is, the ratio of the maximum knock-free manifold pressure with direct ethanol injection to that with conventional gasoline port fuel injection) can be over two, perhaps as high as 2.5, due to the improved knock resistance provided by direct ethanol injection. This approach allows for a very small engine with low rotating inertia which can be spun up to starting speed by means of a low voltage system (that is, less than 42 volts) and a more sophisticated starter motor in a time period which would not be noticeable to a driver once a foot is removed from the brake or put on the accelerator pedal. In this way, the very significant fuel economy benefits of engine shutdown during deceleration and idle would add substantially to the benefits from the use of direct ethanol injection technology.

If the variable direct injection of ethanol approach were implemented in such a way that both fuels were injected directly through either one or two injectors, such operation would be more favorable from the point of view of emissions since there would be no fuel-wetted inlet port walls whose small fuel content could pass through the exhaust system unburned. However, even with port-fuel injection (PFI) for the gasoline fuel, it is possible to shut off the fuel during deceleration as is already being done in full hybrid vehicles. The use of ethanol direct injection only is preferred since it is an accurate means of controlling the fueling rate of the engine, especially during transients. Thus during deceleration it is possible to instantaneously (within a few engine cycles) enable direct injection fueling and then decrease it by shutting off the direct injection, even if fuel continues to flow from film previously deposited by the PFI in the inlet manifold. Further, during strong acceleration, direct injection allows for instantaneously increased fueling, as opposed to PFI, which first needs to build a fuel film with its associated time delay. Thus, an engine can have fast response during acceleration after engine restart. Instantaneously increased fueling also leads to faster restart requiring less electrical energy from a starter system. Another approach to other possible emissions issues is the installation of valve disablers in all cylinders for the deceleration and idle shutdown modes. Valve disablers in and of themselves are not very costly and are already used in production "displacement on demand" applications.

A requirement of the system disclosed herein is keeping critical auxiliaries operative during the shutdown mode. This requirement can be met on a partial basis with an oversized low voltage (such as a 12-Volt) battery. An option is not to employ shutdown during times of greatest use of auxiliaries, such as when maximum air conditioning is being used. In an embodiment of the invention, an automatic control system prevents engine shutdown when the auxiliary power and/or energy needs exceed a selected level. In this way, the efficiency benefit of engine shutdown can be utilized under most situations without having to increase battery capability substantially during the relatively small fraction of times in which there is an especially high battery power/energy requirement.

The combination of such a control system for disabling engine shutdown and the use of a highly downsized small engine can allow the use of a low voltage (such as 12 Volt) electrical system (with a modest incremental battery requirement as well as a more powerful electric starting motor), resulting in a safer and substantially lower cost relative to a higher voltage system that would otherwise be needed.

The operation of an embodiment of the invention disclosed herein will be discussed now in conjunction with FIG. 1. An electronic and fuel management control module 10 controls the flow of gasoline from a gasoline source 12 and flow of antiknock fuel such as ethanol from a supply 14 into an engine 16. At least the ethanol from the source 14 is directly injected into the engine by an injector 18. Gasoline may be directly injected or port fuel injected. The engine 16 preferably includes a turbocharger or supercharger 20. During vehicle deceleration and idle, the fuel management control module 10 stops the flow of gasoline and ethanol. When a driver lifts his foot from the brake pedal and/or puts it on the accelerator pedal, a starter motor 22 starts the engine 16 sufficiently quickly that the delay is not noticeable to the driver. The control module 10 starts the flow of ethanol, during engine restart.

It is noted that the approach disclosed herein can be employed with methanol or another alcohol or alcohol blends in place of ethanol. Wherever the term gasoline is used, a mix of gasoline and ethanol is also contemplated. The system disclosed herein can also be employed using ethanol, E85, methanol or another alcohol or a blend of these fuels as a sole fuel.

What is claimed is:

1. Fuel management system for operation of a spark ignition gasoline engine in a vehicle comprising:
    a gasoline engine powering the vehicle;
    a source of gasoline for introduction into the engine;
    a separate source of ethanol;
    an injector for direct injection of the ethanol into a cylinder of the engine; and
    a control system for shutting down the engine by stopping gasoline and ethanol flow into the engine during vehicle deceleration and idling and restarting the engine upon driver demand.

2. The system of claim 1 wherein the control system disables the shutting down of the engine during deceleration and idling when an auxiliary power or energy requirement exceeds a selected level.

3. The system of claim 1 wherein the engine uses direct ethanol injection during engine restart to prevent engine knock.

4. The system of claim 1 wherein the engine uses direct ethanol injection during engine restart to minimize hydrocarbon emissions.

5. The system of claim 1 wherein the engine uses direct injection during engine restart to supplement port fuel injection while a fuel film that feeds the engine is established so as to minimize energy, emissions and time required for engine restart.

6. The system of claim 1 further including a valve disabler for all engine valves.

7. The system of claim 1 wherein the engine is turbocharged or supercharged.

8. The system of claim 6 wherein maximum manifold pressure is increased by at least a factor of two over a non-pressure-boosted engine.

9. The system of claim 1 further including a 12 V motor to restart the engine after shutdown during deceleration and/or idle.

10. The system claim 8 wherein the low voltage motor is a low voltage motor.

11. The system of claim 1 wherein the gasoline and the ethanol are injected through the same fuel injector.

12. The system of claim 1 wherein gasoline is not used and ethanol, E85, methanol, other alcohols or a blend thereof are used as the only fuel.

13. A turbocharged spark ignition engine which uses separately controlled direct injection of ethanol and port fuel injection of gasoline and where the engine is shut down during periods of deceleration and idle comprising
- a first source of gasoline;
- a second source of ethanol;
- a gasoline engine;
- and a means to engine cylinder deactivation through valve disabling during engine deceleration and idling.

14. The turbocharged spark ignition engine of claim 13 where the engine uses direct ethanol injection during engine restart to prevent knock.

15. The turbocharged spark ignition engine of claim 13 where the engine uses direct ethanol injection during engine restart to minimize emissions.

16. The turbocharged spark ignition engine of claim 13 where a low voltage motor is used to restart the engine.

17. A turbocharged spark ignition engine which uses separately controlled direct injection of ethanol and port fuel injection of gasoline and where the engine is shut down during periods of deceleration and idle comprising
- a first source of gasoline;
- a second source of ethanol;
- a gasoline engine; and
- a means to disable the engine cylinders and where direct ethanol injection is used during engine restart and further where a low voltage motor is used for engine restart.

18. A turbocharged spark ignition engine which uses direct injection of ethanol and where the engine is shut down during periods of deceleration and idle comprising
- a turbocharged spark ignition engine;
- and a means to shutdown the engine cylinders
- and where direct ethanol injection is used during engine restart
- and further where a low voltage motor is used for engine restart.

* * * * *